(12) United States Patent
Putman (10) Patent No.: US 10,742,490 B2
(45) Date of Patent: Aug. 11, 2020

(54) NETWORK ACCESS SUB-NODE CONFIGURATION BY A PROXY

(71) Applicant: Airspan Networks Inc., Boca Raton, FL (US)

(72) Inventor: Anthony Edward Putman, Chippenham (GB)

(73) Assignee: AIRSPAN NETWORKS INC., Boca Raton, FL (US)

( * ) Notice: Subject to any disclaimer, the term of this patent is extended or adjusted under 35 U.S.C. 154(b) by 335 days.

(21) Appl. No.: 15/655,051

(22) Filed: Jul. 20, 2017

(65) Prior Publication Data

US 2019/0028344 A1    Jan. 24, 2019

(51) Int. Cl.
*H04L 12/24* (2006.01)

(52) U.S. Cl.
CPC ...... *H04L 41/0806* (2013.01); *H04L 41/0886* (2013.01); *H04L 41/0803* (2013.01); *H04L 41/0816* (2013.01)

(58) Field of Classification Search
CPC ............. H04L 41/0816; H04L 41/0806; H04L 41/0803; H04L 41/0886; H04L 41/0813;
(Continued)

(56) References Cited

U.S. PATENT DOCUMENTS 6,286,038 B1 * 9/2001 Reichmeyer ........ H04L 41/0213
709/220
9,191,275 B1 * 11/2015 Worsley .............. H04L 41/0803
(Continued)

FOREIGN PATENT DOCUMENTS

CN    102448186 B    2/2016
EP      2627137 A1    8/2013
(Continued)

OTHER PUBLICATIONS

PCT Int'l Search Report and Written Opinion from related case PCT/GB2018/051646 dated Sep. 19, 2018, 19 pages.
(Continued)

*Primary Examiner* — Lance Leonard Barry
(74) *Attorney, Agent, or Firm* — Haynes Beffel & Wolfeld LLP (57) ABSTRACT

An apparatus and method of performing a configuration process in the apparatus are provided. The apparatus has a backhaul sub-node to provide a backhaul connection to a communications network which comprises a proxy system. It also has an access sub-node to provide an access cell to which user equipment can connect. In a configuration process the backhaul sub-node performs a backhaul sub-node auto-configuration process comprising connecting to a further network node, determining backhaul sub-node configuration parameters, and storing in the proxy system at least one configuration parameter for the access sub-node in dependence on the backhaul sub-node configuration parameters determined. When the access sub-node then issues an access sub-node auto-configuration request, the proxy system intercepts the access sub-node auto-configuration request and responds to the access sub-node in dependence on the at least one configuration parameter for the access sub-node stored. Transparent to the access sub-node, the backhaul sub-node can thus modify the default configuration which the access sub-node would receive, based on the specific backhaul connectivity which it has established for itself.

19 Claims, 7 Drawing Sheets

(58) Field of Classification Search
CPC .... H04L 41/08; H04W 24/02; H04W 88/182; H04W 84/047
See application file for complete search history.

(56) References Cited

U.S. PATENT DOCUMENTS

| | | |
|---|---|---|
| 2009/0129291 A1 | 5/2009 | Gupta et al. |
| 2010/0014415 A1 | 1/2010 | Moeller |
| 2011/0045835 A1 | 2/2011 | Chou et al. |
| 2013/0013752 A1* | 1/2013 | Herrera Van Der Nood ............... H04L 41/0886 709/220 |
| 2013/0294288 A1 | 11/2013 | Choi et al. |
| 2014/0003332 A1 | 1/2014 | Bennett et al. |
| 2014/0204846 A1 | 7/2014 | Maltsev et al. |
| 2014/0233412 A1 | 8/2014 | Mishra et al. |
| 2014/0323137 A1 | 10/2014 | Graffagnino et al. |
| 2015/0006689 A1* | 1/2015 | Szilagyi ............... H04L 41/0886 709/222 |
| 2015/0245272 A1 | 8/2015 | Lindoff et al. |
| 2016/0029430 A1 | 1/2016 | Mishra et al. |
| 2016/0142880 A1 | 5/2016 | Talluri et al. |
| 2016/0381574 A1* | 12/2016 | Dudzinski ........... H04L 41/0806 370/254 |
| 2016/0381585 A1* | 12/2016 | Dudzinski .............. F16M 11/06 370/252 |
| 2017/0055304 A1 | 2/2017 | Pappa et al. |
| 2017/0245311 A1 | 8/2017 | Murray et al. |

FOREIGN PATENT DOCUMENTS

| | | |
|---|---|---|
| GB | 2539730 A | 12/2016 |
| GB | 2539731 A | 12/2016 |
| GB | 2539730 A8 | 1/2017 |
| WO | 2016028969 A1 | 2/2016 |

OTHER PUBLICATIONS

PCT Int'l Search Report and Written Opinion from related case PCT/GB2018/051639 dated Aug. 14, 2018, 23 pages.
PCT IPRP from counterpart PCT/GB2018/051646 dated Jul. 4, 2019, 23 pages.
U.S. Office Action in U.S. Appl. No. 15/655,035 dated Aug. 15, 2019, 14 pages.
PCT IPRP from related case PCT/GB2018/051639 dated Oct. 11, 2019, 21 pages.

* cited by examiner

NETWORK ACCESS SUB-NODE CONFIGURATION BY A PROXY

TECHNICAL FIELD

The present disclosure relates to networks. More particularly it relates to configuring a node for participating in the network, for example on deployment.

BACKGROUND

In modern communication networks, for example such as a mobile network that is used to support mobile communication, the need exists to support an ever increasing number of devices connected to the network and to improve the coverage of the network so that the connected devices are provided with a high capacity connection, regardless of their location.

The problems of providing sufficient network coverage and capacity can be particularly problematic in urban environments, where there are typically not only a high density of users, but where the urban infrastructure, such as large buildings, can significantly attenuate signals. For this reason there may be a desire to deploy more and more network nodes which support the network, but doing so also brings with it a requirement for newly deployed nodes to be specifically configured for their deployment, which may require bespoke configurations to be provided for a large number of nodes, adding complexity to the process of node deployment.

SUMMARY

In one example configuration there is an apparatus comprising: a backhaul sub-node to provide a backhaul connection to a communications network and comprising a proxy system; and an access sub-node to provide an access cell to which user equipment can connect, wherein the apparatus is responsive to a configuration trigger to perform a configuration process in which: the backhaul sub-node performs a backhaul sub-node auto-configuration process comprising connecting to a further network node, determining backhaul sub-node configuration parameters, and storing in the proxy system at least one configuration parameter for the access sub-node in dependence on the backhaul sub-node configuration parameters determined; the access sub-node issues an access sub-node auto-configuration request; and the proxy system intercepts the access sub-node auto-configuration request and responds to the access sub-node in dependence on the at least one configuration parameter for the access sub-node stored.

In another example configuration there is a method of performing a configuration process in an apparatus comprising: in a backhaul sub-node of the apparatus capable of providing a backhaul connection to a communications network and comprising a proxy system: performing a backhaul sub-node auto-configuration process comprising connecting to a further network node; determining backhaul sub-node configuration parameters; and storing in the proxy system at least one configuration parameter for an access sub-node capable of providing an access cell to which user equipment can connect in dependence on the backhaul sub-node configuration parameters determined; in the access sub-node: issuing an access sub-node auto-configuration request; and in the backhaul sub-node: the proxy system intercepting the access sub-node auto-configuration request; and responding to the access sub-node in dependence on the at least one configuration parameter for the access sub-node stored.

In another example configuration there is an apparatus comprising: means for providing a backhaul connection to a communications network and comprising proxy means; and means for providing an access cell to which user equipment can connect, wherein the apparatus is responsive to a configuration trigger to perform a configuration process comprising: the means for providing a backhaul connection performing a backhaul sub-node auto-configuration process comprising connecting to a further network node, determining configuration parameters for the means for providing the backhaul connection, and storing in the proxy means at least one configuration parameter for the means for providing the access cell in dependence on the configuration parameters determined; the means for providing an access cell issuing an access sub-node auto-configuration request; and the proxy means intercepting the access sub-node auto-configuration request and responding to the means for providing an access cell in dependence on the at least one configuration parameter for the means for providing an access cell stored.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

Before discussing embodiments with reference to the accompanying figures, the following description of embodiments is provided.

In one embodiment an apparatus is provided comprising: a backhaul sub-node to provide a backhaul connection to a communications network and comprising a proxy system; and an access sub-node to provide an access cell to which user equipment can connect, wherein the apparatus is responsive to a configuration trigger to perform a configuration process in which: the backhaul sub-node performs a backhaul sub-node auto-configuration process comprising connecting to a further network node, determining backhaul sub-node configuration parameters, and storing in the proxy system at least one configuration parameter for the access sub-node in dependence on the backhaul sub-node configuration parameters determined; the access sub-node issues an access sub-node auto-configuration request; and the proxy system intercepts the access sub-node auto-configuration request and responds to the access sub-node in dependence on the at least one configuration parameter for the access sub-node stored.

Accordingly, the apparatus is essentially formed of two parts, namely the backhaul sub-node and the access sub-node, where each performs a different function. The access sub-node is provided to allow user equipment to connect to the apparatus and more specifically for that connection to be forwarded, by means of the backhaul connection provided by the backhaul sub-node, to the communications network. As such, the communications capabilities of the two sub-nodes also differs, because of the respective communication links which they are arranged to provide. On the one hand, where the access sub-node is provided to support communication links to local user equipment, this also means that on its own the access sub-node has a limited ability to determine the network environment in which it has been deployed so that its configuration can be selected such that it will indeed enhance the network coverage making best use of the access sub-node's capability. On the other hand, the backhaul sub-node is capable of connecting to the communications network via the backhaul connection which it provides. Because of this the backhaul sub-node is able to determine its own configuration information, for example by connecting to servers which form part of the network and provide configuration data, as well as gathering information from other sources, for example the typically more powerful antenna system of the backhaul sub-node make it better able to assess the network environment.

The backhaul sub-node of the apparatus additionally comprises a proxy system, which is provided to facilitate the configuration of the access sub-node. In particular, the proxy system stores at least one configuration parameter for the access sub-node. The access sub-node communicates with the further nodes of the network via the backhaul connection provided by the backhaul sub-node and where the proxy system forms part of the backhaul sub-node, it can intercept messages transmitted from the access sub-node relating to the configuration. Specifically, when the access sub-node issues an access sub-node auto-configuration request, which the access sub-node expects to be received by an auto-configuration server in the network, the proxy system can intercept this request, but where this interception is transparent to the access sub-node, in that the response it receives appears to be the expected response from the auto-configuration server.

The proxy system may issue a request to the auto-configuration server on behalf of the access sub-node or it may dispense with this entirely and use the information that it has stored locally in order to generate the required response to the access sub-node. By either mechanism this provides the ability for the proxy system to modify the default auto-configuration information which is received from the auto-configuration server in response to such an auto-configuration request. This therefore means that the response required by the auto-configuration server, and in particular the configuration parameters which it stores, can be simplified in that a static configuration for access sub-nodes of the network can be defined in the auto-configuration server, yet the specific configuration which is provided to the access sub-node of the apparatus when it issues its auto-configuration request is nevertheless tailored to the specific deployment of the apparatus. This is achieved by taking advantage of the capability of the backhaul sub-node to perform its own auto-configuration process and therefore to allow details of the configuration for the access sub-node to be modified by the backhaul sub-node based on the specific backhaul connectivity which it has established. Nevertheless, the ease of set up of the access sub-node (in a "plug-and-play" fashion) is maintained, since the access sub-node is unaware of the changes made to the configuration parameters by the backhaul sub-node and is arranged simply to connect to the default auto-configuration server in the network and to adopt the configuration parameters which it receives in response to its auto-configuration request.

The interception of the access sub-node auto-configuration request may take a variety of forms, but in some embodiments the proxy system is responsive to the access sub-node auto-configuration request to issue a request to an auto-configuration server in the network on behalf of the access sub-node. For example, in a situation in which the proxy system only currently has stored a few bespoke parameters for the access sub-node, on receipt of the auto-configuration request the proxy system may issue the request to the auto-configuration server in the network on behalf of the access sub-node in order to receive the default "full set" of configuration parameters, in order to then modify those few bespoke parameters locally before passing the configuration to the access sub-node.

Accordingly, as well as intercepting messages passing from the access sub-node to the auto-configuration server, the proxy system may intercept messages passing from the auto-configuration server to the access sub-node. Thus in some embodiments the proxy system is configured to intercept a configuration message from the auto-configuration server in the network to the access sub-node and to modify the configuration message in dependence on the at least one configuration parameter for the access sub-node stored.

Configuration messages received from the auto-configuration server may take a variety of forms, but in some embodiments the configuration message comprises a generic access sub-node configuration for access sub-nodes in the network and modifying the configuration message comprises substituting the at least one configuration parameter into the generic access sub-node configuration. This may for example be the default "full set" of configuration parameters mentioned above. The backhaul sub-node then modifies one or more parameters locally, before passing the configuration to the access sub-node.

Indeed the default configuration received from the auto-configuration server may not even be specific to access sub-nodes, and in some embodiments the configuration message comprises a generic node configuration for nodes in the network and modifying the configuration message comprises substituting the at least one configuration parameter into the generic node configuration. In other words, the configuration server may dispense a configuration which may be applied to any new node in the network, including access sub-nodes, backhaul sub-nodes, and so on. This further simplifies the interaction with the auto-configuration server, and gives further flexibility to the bespoke configuration which is then determined and applied locally.

Where the communication of the access sub-node with the rest of the network is mediated by the backhaul sub-node, this gives further opportunities for the backhaul sub-node to administer the configuration of the access sub-node, in the knowledge of certain provisions and constraints which that communication via the backhaul sub-node brings. For example, in some embodiments the configuration message comprises a configuration requirement for access sub-nodes in the network and modifying the configuration message comprises suppressing the configuration requirement in the configuration message, when the configuration requirement is satisfied as part of the backhaul connection to the communications network via the backhaul sub-node. It might be possible for the access sub-node to also implement this requirement, but this would be redundant, and therefore (transparent to the access sub-node) the backhaul sub-node can drop this requirement from the access sub-node's configuration.

The particular configuration requirement may take a variety of forms, but in some embodiments the configuration requirement is a communication security measure. For example this could be an encryption requirement, where access sub-nodes which send packets into the network are required to encrypt those packets. However, in a situation in which the backhaul sub-node already provides this encryption as part of the protocol which it implements for providing the backhaul connection, it knows it can drop the encryption requirement for the access sub-node, without compromising security. As another related example, access sub-nodes might be required to establish a virtual private network (VPN) as part of their communication protocol. In a situation in which the backhaul sub-node already establishes a VPN as part of its own communication protocol, this requirement for the access sub-node can be dropped without compromising security.

The proxy system intercepts the access sub-node auto-configuration request and, as mentioned above, may then respond in various ways, but in some embodiments the proxy system is responsive to the access sub-node auto-configuration request to issue a response to the access sub-node, wherein the response comprises providing the at least one configuration parameter for the second sub-node stored. This may take place in place of or in addition to issuing a request to the auto-configuration server in the network on behalf of the access sub-node. Where the proxy system has a full configuration available for the access sub-node, it may directly respond by providing that configuration. Alternatively, where at least some aspects of the configuration need to be retrieved from the auto-configuration server, the response only occurs once those details have been receive from the auto-configuration server.

However the response is generated, it will depend on the at least one configuration parameter for the access sub-node stored, and in some embodiments the response comprises at least some of the backhaul sub-node configuration parameters determined in the backhaul sub-node auto-configuration process. In other words, some of the parameters which the backhaul sub-node has determined as part of its own auto-configuration process are then used to configure the access sub-node.

As mentioned above, an auto-configuration server in the network may provide configuration parameters which are applicable not only to access sub-nodes, but to other types of node in the network. Accordingly in some embodiments the backhaul sub-node auto-configuration process comprises receiving generic node configuration information from an auto-configuration server in the network.

The backhaul sub-node auto-configuration process may involve reference to, and receiving information from, other servers and/or management devices in the network, and in some embodiments the backhaul sub-node auto-configuration process comprises receiving configuration information from an element management system in the network comprising information regarding other nodes deployed in the network. This knowledge of about other nodes deployed in the network, for example other nodes which are already deployed in the vicinity of the apparatus, can be used to tailor the configuration of the backhaul sub-node, and indeed of the access sub-node, such that interference is avoided (or at least kept to an acceptably low level).

There may be several element management systems in the network, and in some embodiments the backhaul sub-node auto-configuration process comprises selecting the element management system from multiple element management systems in the network and the at least one configuration parameter for the access sub-node stored in the proxy system comprises an indication of the selected element management system. In other words, the proxy system may cause the access sub-node to select the same element management system which has been selected by the backhaul sub-node in its own auto-configuration process.

In some embodiments the backhaul sub-node auto-configuration process comprises receiving location information for the apparatus. This location information for the apparatus could be obtained from a variety of sources. In some embodiments the location information for the apparatus is provided by a GPS receiver. In some embodiments the location information for the apparatus is derived from network connection information for the apparatus. Both sources of location information may be used.

The present techniques are essentially concerned with the provision of a proxy system associated with a node which intercepts a (sub-)node's auto-configuration request and modifies the response which would have been received in the absence of the proxy system. This is therefore not limited to a radio network context. However in some embodiments the backhaul connection is a wireless backhaul connection to the communications network and wherein the access cell is a wireless access cell to which user equipment can connect.

In the context of a wireless network, with radio communication between the nodes, some embodiments provide that the access sub-node comprises more than one antenna system to provide the wireless access cell to which user equipment can connect, and the at least one configuration parameter for the access sub-node stored is arranged to provide selective antenna enablement of the more than one antenna system. In other words where the access sub-node has several antenna systems, each of them may be selectively enabled and disabled. Whilst in general it may be preferable for all of the access sub-node's antenna systems to be active, it may form part of the configuration provided by the proxy system (with the benefit of the backhaul sub-node's knowledge of the network environment) to disable an antenna system if using that antenna system would not be beneficial to the network (for example due to expected interference).

In one embodiment a method of performing a configuration process in an apparatus is provided comprising: in a backhaul sub-node of the apparatus capable of providing a backhaul connection to a communications network and comprising a proxy system: performing a backhaul sub-node auto-configuration process comprising connecting to a further network node; determining backhaul sub-node configuration parameters; and storing in the proxy system at least one configuration parameter for an access sub-node capable of providing an access cell to which user equipment can connect in dependence on the backhaul sub-node configuration parameters determined; in the access sub-node: issuing an access sub-node auto-configuration request; and in the backhaul sub-node: the proxy system intercepting the access sub-node auto-configuration request; and responding to the access sub-node in dependence on the at least one configuration parameter for the access sub-node stored.

In one embodiment an apparatus is provided comprising: means for providing a backhaul connection to a communications network and comprising proxy means; and means for providing an access cell to which user equipment can connect, wherein the apparatus is responsive to a configuration trigger to perform a configuration process comprising: the means for providing a backhaul connection performing a backhaul sub-node auto-configuration process comprising connecting to a further network node, determining configuration parameters for the means for providing the backhaul connection, and storing in the proxy means at least one configuration parameter for the means for providing the access cell in dependence on the configuration parameters determined; the means for providing an access cell issuing an access sub-node auto-configuration request; and the proxy means intercepting the access sub-node auto-configuration request and responding to the means for providing an access cell in dependence on the at least one configuration parameter for the means for providing an access cell stored.

Particular embodiments will now be described with reference to the Figures.

Figure 1:
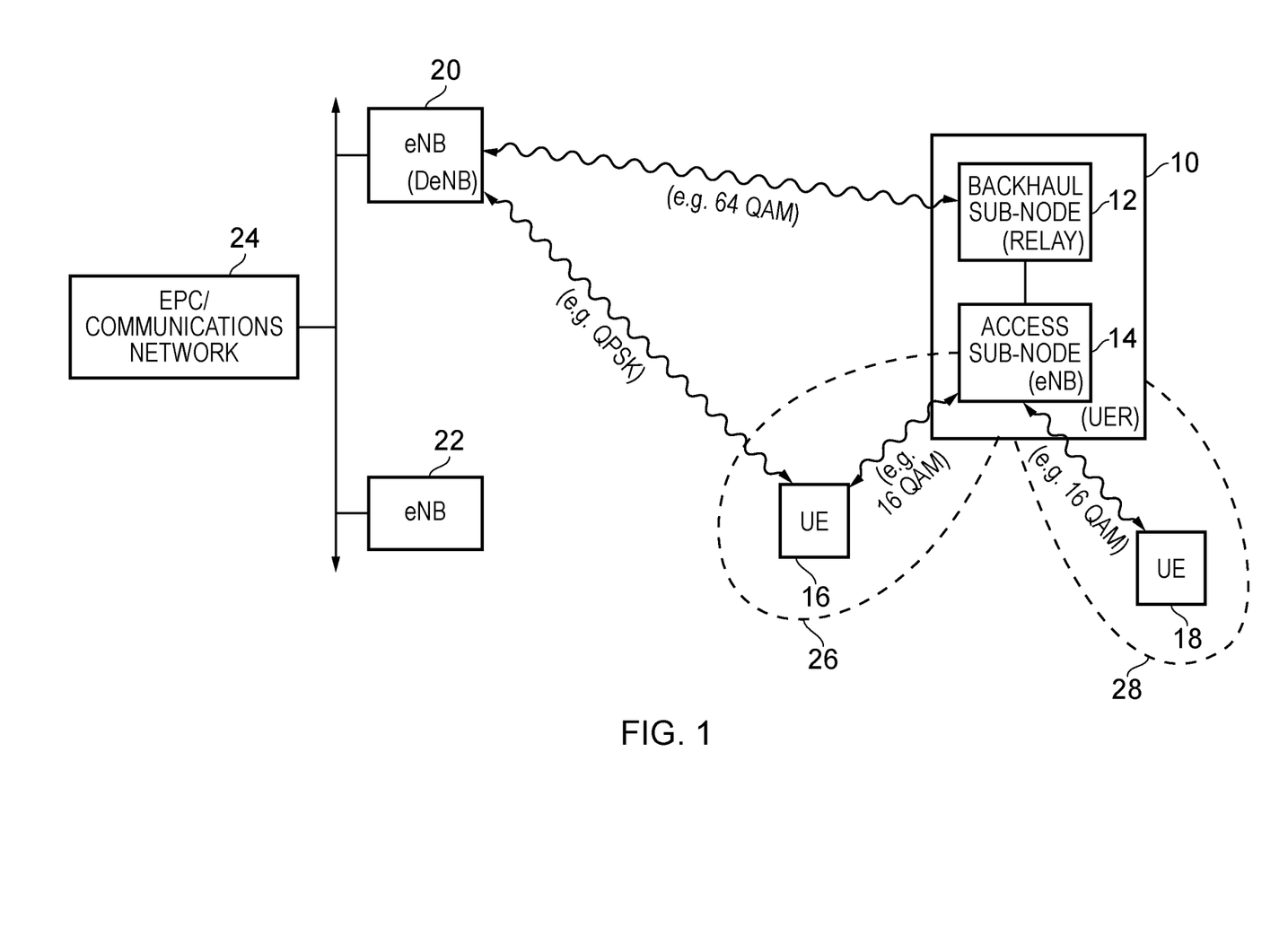
FIG. 1 is a block diagram schematically illustrating an apparatus in accordance with some embodiments, showing its connection to user equipment and to a communications network.

FIG. 1 schematically illustrates an apparatus 10 as used in the described embodiments. This apparatus may also be referred to herein as a combined access and backhaul unit. The apparatus 10 shown in FIG. 1 comprises two distinct sub-node systems, namely the backhaul sub-node 12 and the access sub-node 14. To give useful context to the items shown in FIG. 1, one of ordinary skill in the art will recognise terminology appropriate to the LTE telecommunications standard, with the access sub-node 14 also be labelled "eNB" (eNodeB). The items of user equipment 16 and 18 can connect to the access sub-node 14 by virtue of the access cell which it provides. In some examples the access sub-node may only have a single antenna system and provide one sector of the access cell to which the user equipment can connect. However in the example shown in FIG. 1 the access sub-node 14 comprises two antenna systems which have different orientations (essentially being back-to-back) and this results in the two generated sectors 26 and 28 as shown. The user equipment 18 is illustrated as currently being within the sector 28 generated by the access sub-node 14 and thereby can communicate with the access sub-node in its role as an eNB. The modulation scheme used for this communication link can vary depending on the communication protocol or standard being used and the particular network requirements, but as labelled this may for example be a 16 QAM (Quadrature Amplitude Modulation) link. Similarly the user equipment 16 can form a communication link to the access sub-node 14 in a similar manner, where it is currently within the sector 26 also generated by the access sub-node. Note however that the user equipment 16 is also shown as being able to form a direct communications link to the further eNodeB 20 shown in the figure. In the example shown this communications link is mediated by a QPSK (Quadrature Phase Shift Keying) link, which reflects the fact that there is a greater distance between the user equipment 16 and the eNB 20 by comparison to the distance to the apparatus 10 and the relatively much smaller size of the antenna which is typically provided in user equipment. For this reason, the apparatus 10 provides the backhaul sub-node (relay) 12, connected to the access sub-node 14 via which the connection of the user equipment to the communications network can also be mediated. Further, where the apparatus 10 is a stationary item of hardware intended to be permanently deployed in a given location, the significantly more powerful antenna system with which the backhaul sub-node 12 can be provided enables a higher order connection to the eNodeB 20 (64 QAM in the example shown). For this reason, despite the connection from the user equipment 16 being mediated via two steps to the eNB 20 when passing via the apparatus 10, the greater capacity which the respective links of this communication path are able to handle makes this worthwhile. FIG. 1 also shows that further eNodeB devices such as 22 form part of the network. The eNodeBs 20 and 22 are connected to the EPC/communications network 24. Typically there will be many eNodeBs deployed within a network such as this and only two are shown in FIG. 1 for brevity and clarity. FIG. 1 is provided to give an example of context for the present techniques, which are particularly concerned with the configuration of the access sub-node 14, for example when the apparatus 10 is first deployed, and thus further detail of the manner in which the wider network operates, with which one of ordinary skill in the art will be familiar, are not repeated here.

Figure 2:
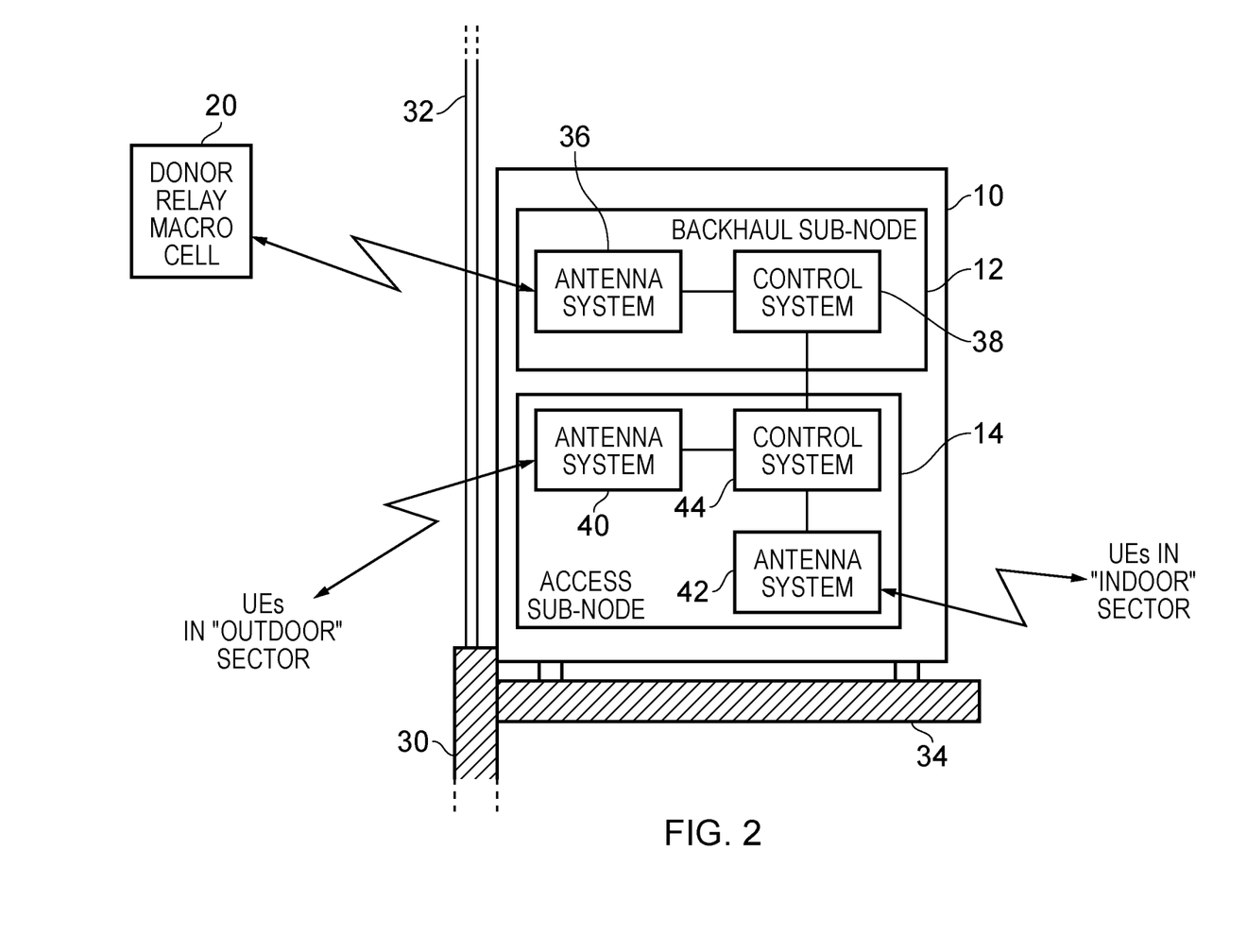
FIG. 2 is a block diagram schematically illustrating an apparatus in accordance with one embodiment.

FIG. 2 schematically illustrates the apparatus 10 in an example deployment. Here, the apparatus 10 is positioned adjacent to the periphery 30, 32 of a building. In this particular example, it is located on a windowsill 34 adjacent to a window 32 at the periphery of the building. The apparatus 10 has three distinct antenna systems, one of which forms part of the backhaul sub-node 12, whilst two form part of the access sub-node 14. The antenna system 42 is used to provide a first "indoor" sector of the network that extends into the building so as to provide enhanced availability of the network to items of user equipment within the building. To access the network for any items of user equipment that connect via the antenna system 42, it is necessary to connect the apparatus 10 into the further network. This is achieved through the use of the antenna system 36, which is arranged to establish a backhaul link with a base station of the network. Such a base station will typically be provided externally to the building and so the antenna system 36 is arranged to generate at least one beam pattern that propagates through the window 32 to establish a wireless backhaul link with the base station 20 to which it connects. The base station 20 is also referred to in FIG. 2 as a donor relay macro cell.

Modern telecommunications standards, such as the LTE standard, allow for high-speed wireless communication with items of user equipment. However, the signals propagated from the base stations typically do not have good indoor penetration. By placing, the apparatus 10 at a periphery of a building, a good quality link can typically be established via the antenna system 36 to a base station of the network, with the use of the antenna system 42 allowing a first section of coverage that extends into the building to provide enhanced availability of the network inside the building.

However, in addition, in urban environments it is also often the case that items of user equipment in the open environment, for example, belonging to users moving around at street level between buildings, can experience poor connectivity. For example, pockets of poor network coverage may develop due to shadowing from the buildings and the like, and even in areas where there is network coverage the link quality established with the base station may be relatively poor. This can result not only in a reduced quality of service observed by certain users, but can also degrade the overall spectral efficiency of the network due to the less efficient utilisation of the available network spectrum that can result from the use of such poor quality links.

In this context, the apparatus 10 provides an additional antenna system within the access sub-node 14, namely the antenna system 40, which provides a second "outdoor" sector of the network, the antenna system 40 generating at least one beam pattern that propagates through the periphery 30, 32 of the building to facilitate communication with at least one item of user equipment external to the building. Hence, through the use of the antenna system 40, the apparatus 10 can re-radiate network coverage externally to the building, such that items of user equipment external to the building and falling within the coverage area of the "outdoor" sector are now provided with a further connections option for connecting into the network.

Whether users connect to the apparatus 10 via the antenna system 40 or the antenna system 42, the link to the network is provided via the control system 44 which controls the operation of the access sub-node 14 (including its two antenna systems) and via the control system 38 which controls the operation of the backhaul sub-node 12 including its antenna system. The antenna system 36 thus provides a common wireless backhaul link into the communications network. By this approach, it is possible to establish good quality links with items of user equipment in both the "outdoor" sector and the "indoor" sector. In combination with a good quality backhaul link provided by the antenna system 36, and recalling that this apparatus 10 is a stationary item of hardware such that the antenna system 36 can be relatively large and powerful (in particular when compared to an item of user equipment), this can result in the items of user equipment connected via the apparatus 10 being provided with higher quality links into the network, allowing for more efficient use of the available network spectrum when compared with a situation where those items of user equipment would instead establish a direct connection to the macro base station of the network. As a result the overall spectral efficiency of the network can be increased. It should be noted that each of the antenna systems 36, 40, 42 will include not only an array of antenna elements used to transmit and receive the RF signals, but also the associated RF stage circuit elements that process the transmitted and received RF signals. Additionally each of the antenna systems will have an associated base band stage (i.e. digital signal processing stage) circuits for processing the transmitted signals prior to them being converted into RF signals and to process received signals after they have been converted from RF signals into baseband signals. These baseband stage circuits can be considered to be provided as part of the antenna system blocks 36, 40, 42 or may be considered to be part of the respective associated control systems 38, 44 that control the operation of the various antenna systems and interactions between them.

It should be noted that FIG. 2 is not intended to illustrate how the various components are physically laid out within the apparatus 10, but instead is merely a schematic illustration of the different antenna systems and associated control systems. For example, whilst the antenna system 36 is above the antenna system 40 in the figure, in some embodiments these antenna systems are physically side-by-side.

Figure 3:
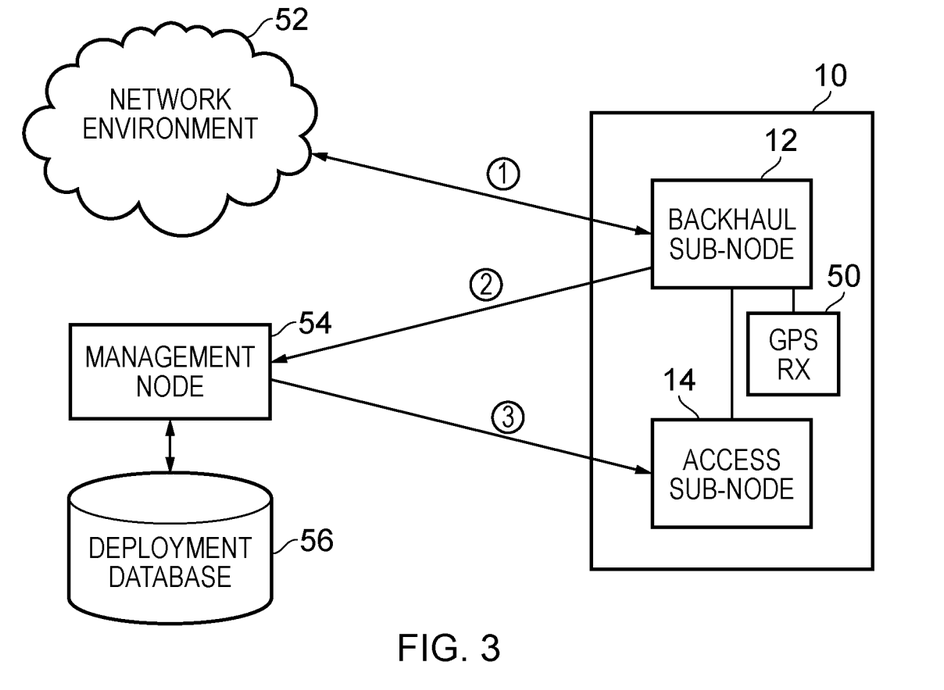
FIG. 3 illustrates how the apparatus of some embodiments connects to the network environment in order to initiate a configuration for its access sub-node.

FIG. 3 schematically illustrates the apparatus 10 in an example deployment and a configuration process by means of which the access sub-node 14 of the apparatus 10 is configured. As shown by the numbered arrows in FIG. 3, the configuration process begins by the backhaul sub-node connecting to the "network environment" 52. In this example, where the terminology of an LTE network is continued, the backhaul sub-node 12 connects as an LTE user equipment (UE) device. It should be understood that this connection to the "network environment" will specifically comprise the backhaul sub-node (as an LTE UE device) connecting to a donor eNodeB (DeNB) such as item 20 shown in FIG. 2. However, the illustration of the network environment 52 in FIG. 3 is intended to communicate that the backhaul sub-node 12 can in principle interact with many different visible macro base stations on the network, for example, by initially scanning the appropriate bands to determine which macro base stations are visible in the vicinity, before establishing a communication link with one of them. Further, the illustration of the network environment 52 in FIG. 3 is intended to communicate that via this link the backhaul sub-node 12 is then connected to the wider network and a communication link (mediated by a selected macro base station) can then be established with any node in the system for the exchange of information). FIG. 3 illustrates such a further node, namely the management node 54. This management node 54 is provided to enable a deployment of the apparatus 10 which enables efficient usage to be made of the access sub-node 14 and thus that the overall spectral efficiency of the network is maintained. The management node 54 has an overview of the network, and in particular the nodes already deployed in the vicinity of the apparatus 10, which enables it to adapt the configuration to be provided to the access sub-node 14 for this purpose. One source of information to which the management node 54 has access is the deployment database 56, which records where nodes of the network (including items of hardware such as the apparatus 10) have been deployed and the respective roles that they are playing in the operation of the network. The management node 54, in generating a bespoke configuration for the access sub-node 14, also benefits from information which it receives from the backhaul sub-node 12. Given the more powerful antenna system 36 which forms part of the backhaul sub-node 12 (by comparison to either of the antenna systems 40, 42 of the access sub-node 14) the backhaul sub-node 12 is better able to gather information about the environment in which the apparatus 10 has been deployed, in particular other visible nodes of the network which need to be taken into account when configuring the access sub-node 14.

As shown in FIG. 3 therefore after the initial step "1" in which the backhaul sub-node connects to the network environment 52, it then transmits (step "2") at least some of this gathered information about the environment to the management node 54. Note that FIG. 3 also illustrates a specific item of information which the backhaul sub-node 12 can transmit to the management node 54, namely an accurate indication of the geographical position at which the apparatus 10 has been deployed by means of the GPS receiver 50 which forms part of the apparatus 10. The management node 54 then combines the information which it has received from the backhaul sub-node 12 with other information to which it has access, such as from the deployment database 56, and generates a bespoke configuration for the access sub-node 14. The management node 54 then transmits this configuration (step "3") to the apparatus 10. It will be understood by comparison with FIGS. 1 and 2 that the arrow leading from management node 54 to the access sub-node 14 does not represent a direct communications path, but rather where the management node 54 is part of the existing network, communications from the management node 54 are mediated by the backhaul link which the backhaul sub-node 12 has established with a local macro base station and from the backhaul sub-node 12 is communicated to the access sub-node 14. Thus, configured, the deployed apparatus 10 is then ready for operation, where the automated configuration process provided means that little, if any, technical input is required for the deployment of the apparatus 10. This means that the apparatus 10 can for example be provided to end users (as opposed to technicians) to install, say placed on a windowsill as in the example of FIG. 2, and the automated "plug-and-play" configuration process for the device provided means that the end user needs to do little more than to switch the apparatus on.

Figure 4:
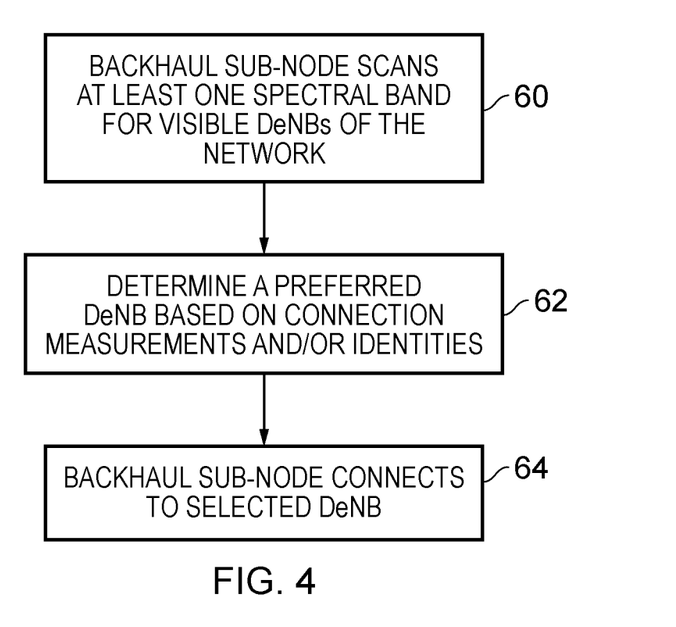
FIG. 4 shows a sequence of steps carried out in the apparatus of some embodiments when connecting to the network environment.

FIG. 4 shows a sequence of steps which are taken in one embodiment when an apparatus (e.g. apparatus 10 in FIGS. 1-3) is deployed. FIG. 4 represents an initial set of steps according to which the backhaul sub-node 12 assesses the network environment in which it finds itself and forms a connection into the wider network. Firstly, at step 60, the backhaul sub-node 12 scans at least one spectral band for visible donor eNodeBs which are "visible", i.e. from which the antenna system of the backhaul sub-node 12 receives a signal in that at least one spectral band when in a receiver mode. Then at step 62 the backhaul sub-node 12 determines a preferred eNodeB from the visible donor eNodeBs (where this decision can be based on various connection measurements and/or identities), and then at step 64 the backhaul sub-node connects to the selected donor eNodeB (macro base station).

Figure 5:
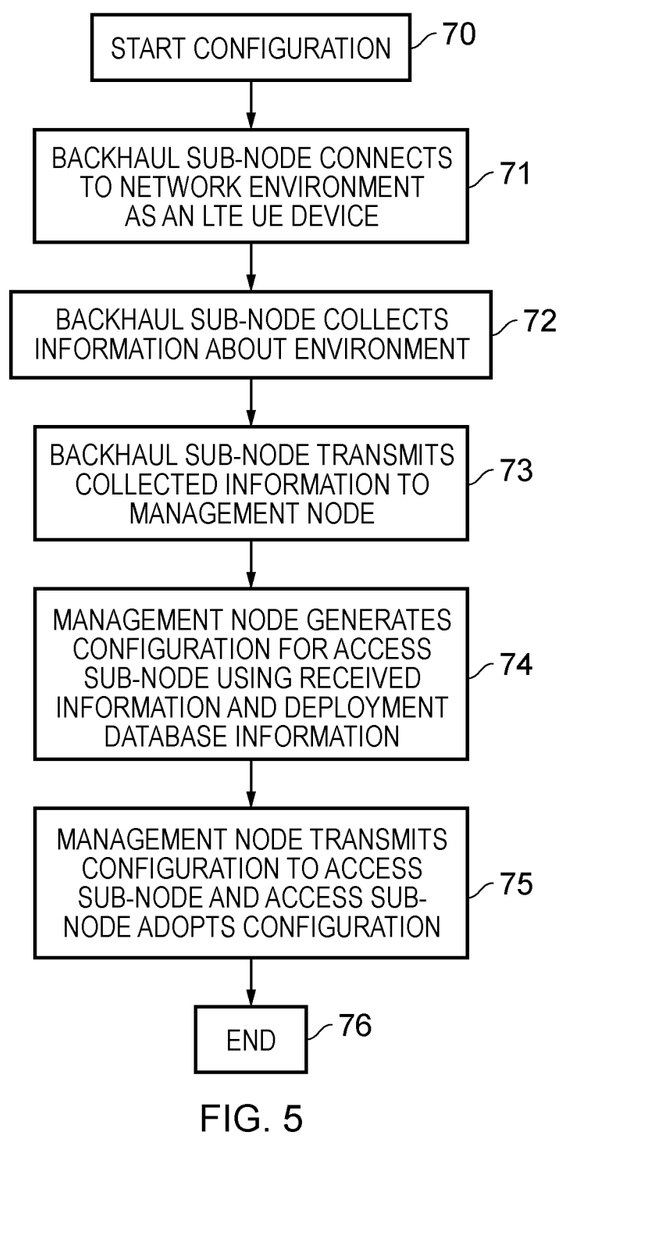
FIG. 5 shows a sequence of steps which are taken when carrying out the method of some embodiments in order to configure the access sub-node of the apparatus.

Next, FIG. 5 shows a sequence of steps which more generally describe the process by which the apparatus 10 is configured on deployment, and in particular to configure the access sub-node 14. The configuration process begins at step 70 in response to a configuration trigger. This configuration trigger may take a variety of forms, depending on when this current configuration process is required to be carried out, but in a typical implementation the configuration process will be carried out when the apparatus 10 is newly deployed and switched on for the first time. Accordingly, the start-up process of the device can be configured to provide this configuration trigger to start the configuration procedure. At step 71 the backhaul sub-node connects to the network environment as an LTE UE device, where reference is made to the example deployment of the apparatus 10 in the LIE environment discussed with reference to FIG. 1. Then at step 72 the backhaul sub-node collects information about the environment in which the apparatus 10 has been deployed. Step 71 may be carried out as described above with reference to FIG. 4, and the information gathered about the visible DeNBs of the network can provide one set of information about the environment in which the apparatus has been deployed. Further, the backhaul sub-node receives a signal from the GPS receiver 50, giving an indication of the geographical location of the deployment. Other information about the deployment may also be collected by backhaul sub-node, which may include a limited degree of user interaction, for example to allow the user to indicate the type of deployment environment, e.g. on a windowsill, or mounted in another configuration. The information gathered by the backhaul sub-node is then transmitted at step 73 to the management node 54 in the network. It should be noted that there may in fact be more than one management node 54 provided in the network and part of the initial connection (and configuration) of the backhaul sub-node to the network environment 52 may comprise selecting a management node to connect to. At step 74 the management node generates a configuration for the access sub-node 14 using the received information and by accessing its deployment database 56 for information relating to the deployment of the apparatus 10 on the basis of the information provided. For example, having received an indication of the geographical location at which the apparatus 10 has been deployed (by means of the GPS data) the management node 54 can determine from the deployment database 56 what other nodes of the network are currently deployed in the vicinity of the apparatus 10, and modify the configuration of the access sub-node 14 accordingly, so that the access sub-node 14 does not negatively interfere with the existing network coverage provided. At step 75 the management node transmits the configuration to the access sub-node 14 (again recalling that this is via the backhaul connection provided by the backhaul sub-node 12) and the access sub-node then adopts the provided configuration and then the full apparatus 10 may then begin operation. The flow ends at step 76.

Figure 6:
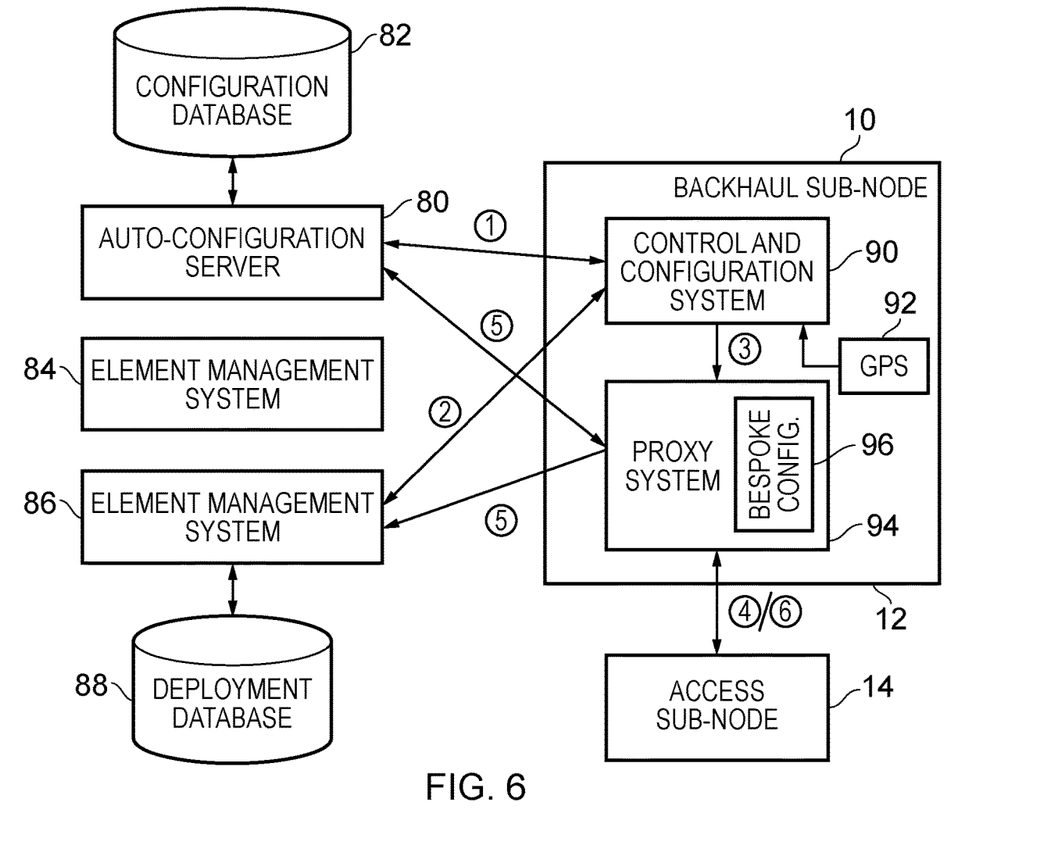
FIG. 6 is a block diagram schematically illustrating an apparatus in accordance with some embodiments and some further network components with which it interacts, wherein a proxy system in the apparatus is arranged to intercept configuration requests received from the access sub-node of the apparatus.

FIG. 6 schematically illustrates the apparatus 10 in an example deployment and a configuration process by means of which the access sub-node 14 of the apparatus 10 is configured. The configuration process begins by the backhaul sub-node 12 determining its own configuration information. This may be derived from multiple sources, such as information relating to the location of the apparatus, an auto-configuration server in the network, an element management system, and potentially from other systems in the network as well. As shown in the figure, in a first step ("1") in this example the control and configuration system 90 of the backhaul sub-node 12 contacts the auto-configuration server 80 in the network. This provides a standard auto-configuration set of deployment parameters to the backhaul sub-node. These may be retrieved from a configuration database 82. The backhaul sub-node may modify these default parameters in dependence on the particular deployment of the apparatus 10 and depending on other knowledge which it has of its environment. In a next step ("2") the control and configuration system 90 of the backhaul sub-node 12 contacts an element management system 86 in the network. This may involve registering with the element management system (as a newly deployed node) and also receiving information about other deployed nodes in the vicinity. Note that as shown in FIG. 6 more than one element management system 84, 86 may be present in the network, and the backhaul sub-node may choose a specific element management system to register with, for example based on its location. Next the control and configuration system 90 of the backhaul sub-node 12 configures the proxy system 94 with information that has been obtained during its own configuration procedure. This information thus represents bespoke configuration data 96, which is then held in the proxy system 94 for the access sub-node 14. This information is then used to modify messages from the auto-configuration server 80 which are directed to the access sub-node 14. For example the auto-configuration server may provide the address of a default element management server 84 to contact, and this may be modified to provide the address of the element management server 86, which the backhaul sub-node has selected in its own configuration procedure.

Subsequently, when the access sub-node attempts to configure itself by contacting the auto-configuration server—in accordance with the usual plug-and-play set-up procedure, the request (step "4") is intercepted by the backhaul sub-node, and a response is provided by the proxy system 94 instead. If required the proxy system may (step "5") issue a request to the auto-configuration server on behalf of the access sub-node, or if it has sufficient information locally available (e.g. that it has derived as part of its own configuration procedure) then it may directly respond to the access sub-node. Either way, the default configuration that would have been received from the auto-configuration server (in the absence of the proxy system) is modified, and the access sub-node receives (step "6") a response which appears to have come from the auto-configuration server. The access sub-node then configures itself in accordance with the information which it has received.

Note also that the protocol which is used to supply the auto-configuration information is not relevant to this procedure. It may be a standard protocol (such as DHCP) or it may be any other protocol used for this purpose. The access sub-node is not aware of the role played by the backhaul sub-node, which means that it may be deployed using many different backhaul technologies. However, when it is used with a backhaul sub node which supports the auto-configuration proxy, then additional information is included which may optimise the configuration of the access sub-node.

Figure 7:
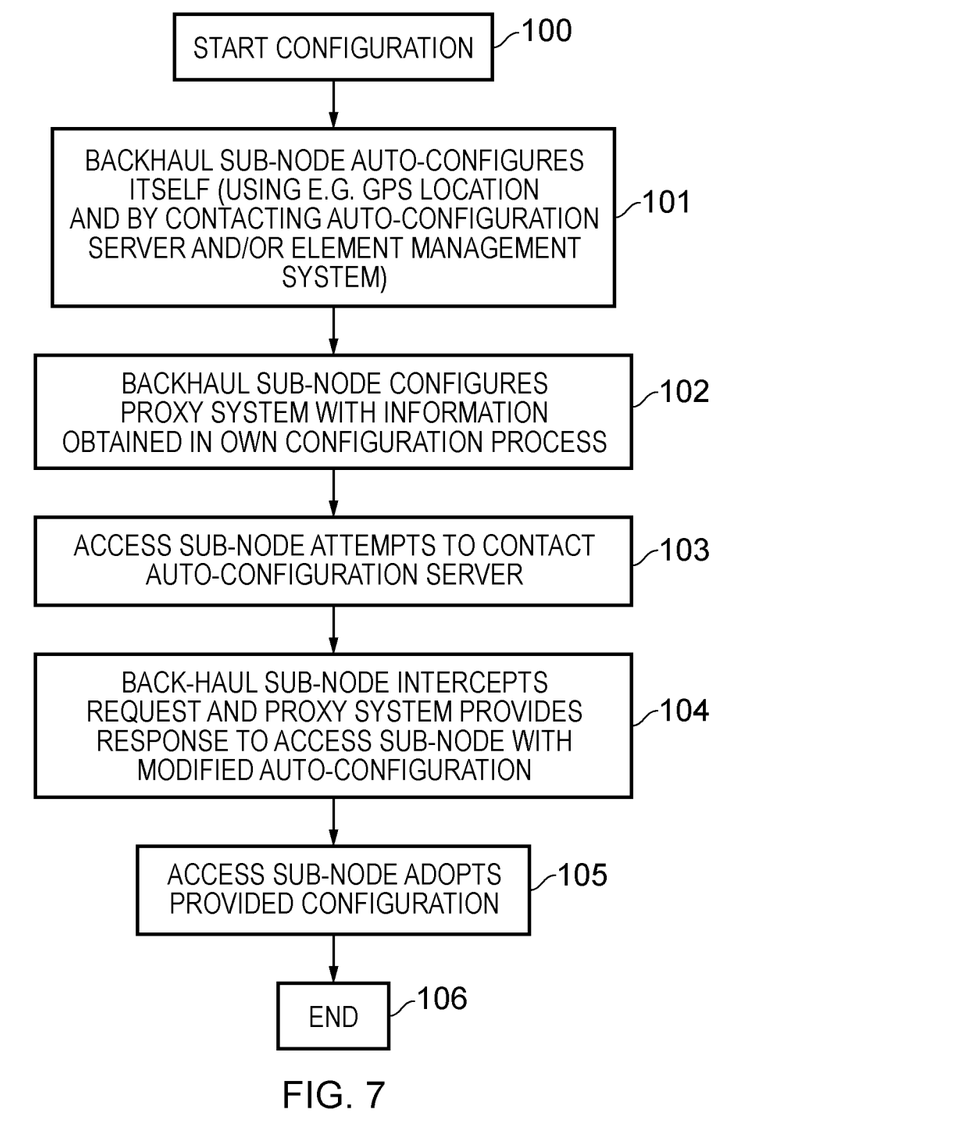
FIG. 7 shows a sequence of steps which are taken in the method of some embodiments in order to configure the access sub-node.

FIG. 7 shows a sequence of steps which are carried out to configure the apparatus 10 on deployment. The configuration process begins at step 100 in response to a configuration trigger. This configuration trigger may take a variety of forms, depending on when this current configuration process is required to be carried out, but in a typical implementation the configuration process will be carried out when the apparatus 10 is newly deployed and switched on for the first time. Accordingly, the start-up process of the device can be configured to provide this configuration trigger to start the configuration procedure. At step 101 the backhaul sub-node performs its own auto-configuration process. As described above, this may involve local information (for example from its own GPS receiver) and may involve the backhaul sub-node contacting an auto-configuration server in the network, an element management system, and potentially from other systems in the network as well. Then at step 102 the backhaul sub-node configures the proxy system with the information that has been obtained during its own configuration procedure. Next, at step 103, the access sub-node attempts to configure itself by contacting the auto-configuration server. The backhaul sub-node intercepts (step 104) this communication (specifically it identifies a request destined for the auto-configuration server from the access sub-node and handles this request itself, rather than passing it on) and it provides a response, in the format which the access sub-node is expecting from the auto-configuration server, but in which the default configuration which would have been received from the auto-configuration server (in the absence of the proxy system) is modified. At step 105 the access sub-node configures itself in accordance with the information which it has received and the steps conclude at step 105.

In brief overall summary, an apparatus and method of performing a configuration process in the apparatus are provided. The apparatus has a backhaul sub-node to provide a backhaul connection to a communications network which comprises a proxy system. It also has an access sub-node to provide an access cell to which user equipment can connect. In a configuration process the backhaul sub-node performs a backhaul sub-node auto-configuration process comprising connecting to a further network node, determining backhaul sub-node configuration parameters, and storing in the proxy system at least one configuration parameter for the access sub-node in dependence on the backhaul sub-node configuration parameters determined. When the access sub-node then issues an access sub-node auto-configuration request, the proxy system intercepts the access sub-node auto-configuration request and responds to the access sub-node in dependence on the at least one configuration parameter for the access sub-node stored. Transparent to the access sub-node, the backhaul sub-node can thus modify the default configuration which the access sub-node would receive, based on the specific backhaul connectivity which it has established for itself.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device in the apparatus may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. An apparatus comprising:
a backhaul sub-node to provide a backhaul connection to a communications network and comprising a proxy system; and
an access sub-node to provide an access cell to which user equipment can connect,
wherein the apparatus is responsive to a configuration trigger to perform a configuration process in which:
the backhaul sub-node performs a backhaul sub-node auto-configuration process comprising connecting to a further network node, determining backhaul sub-node configuration parameters, and storing in the proxy system at least one configuration parameter for the access sub-node in dependence on the backhaul sub-node configuration parameters determined;
the access sub-node issues an access sub-node auto-configuration request; and
the proxy system intercepts the access sub-node auto-configuration request and responds to the access sub-node in dependence on the at least one configuration parameter for the access sub-node stored.

2. The apparatus as claimed in claim 1, wherein the proxy system is responsive to the access sub-node auto-configuration request to issue a request to an auto-configuration server in the network on behalf of the access sub-node.

3. The apparatus as claimed in claim 2, wherein the proxy system is configured to intercept a configuration message from the auto-configuration server in the network to the access sub-node and to modify the configuration message in dependence on the at least one configuration parameter for the access sub-node stored.

4. The apparatus as claimed in claim 3, wherein the configuration message comprises a generic access sub-node configuration for access sub-nodes in the network and modifying the configuration message comprises substituting the at least one configuration parameter into the generic access sub-node configuration.

5. The apparatus as claimed in claim 3, wherein the configuration message comprises a generic node configuration for nodes in the network and modifying the configuration message comprises substituting the at least one configuration parameter into the generic node configuration.

6. The apparatus as claimed in claim 3, wherein the configuration message comprises a configuration requirement for access sub-nodes in the network and modifying the configuration message comprises suppressing the configuration requirement in the configuration message, when the configuration requirement is satisfied as part of the backhaul connection to the communications network via the backhaul sub-node.

7. The apparatus as claimed in claim 6, wherein the configuration requirement is a communication security measure.

8. The apparatus as claimed in claim 1, wherein the proxy system is responsive to the access sub-node auto-configuration request to issue a response to the access sub-node, wherein the response comprises providing the at least one configuration parameter for the access sub-node stored.

9. The apparatus as claimed in claim 8, wherein the response comprises at least some of the backhaul sub-node configuration parameters determined in the backhaul sub-node auto-configuration process.

10. The apparatus as claimed in claim 1, wherein the backhaul sub-node auto-configuration process comprises receiving generic node configuration information from an auto-configuration server in the network.

11. The apparatus as claimed in claim 1, wherein the backhaul sub-node auto-configuration process comprises receiving configuration information from an element management system in the network comprising information regarding other nodes deployed in the network.

12. The apparatus as claimed in claim 11, wherein the backhaul sub-node auto-configuration process comprises selecting the element management system from multiple element management systems in the network and the at least one configuration parameter for the access sub-node stored in the proxy system comprises an indication of the selected element management system.

13. The apparatus as claimed in claim 1, wherein the backhaul sub-node auto-configuration process comprises receiving location information for the apparatus.

14. The apparatus as claimed in claim 13, wherein the location information for the apparatus is provided by a Global Positioning System (GPS) receiver.

15. The apparatus as claimed in claim 13, wherein the location information for the apparatus is derived from network connection information for the apparatus.

16. The apparatus as claimed in claim 1, wherein the backhaul connection is a wireless backhaul connection to the communications network and wherein the access cell is a wireless access cell to which user equipment can connect.

17. The apparatus as claimed in claim 16, wherein the access sub-node comprises more than one antenna system to provide the wireless access cell to which user equipment can connect, and the at least one configuration parameter for the access sub-node stored is arranged to provide selective antenna enablement of the more than one antenna system.

18. A method of performing a configuration process in an apparatus comprising:
   in a backhaul sub-node of the apparatus capable of providing a backhaul connection to a communications network and comprising a proxy system:
      performing a backhaul sub-node auto-configuration process comprising connecting to a further network node;
      determining backhaul sub-node configuration parameters; and
      storing in the proxy system at least one configuration parameter for an access sub-node capable of providing an access cell to which user equipment can connect in dependence on the backhaul sub-node configuration parameters determined;
   in the access sub-node:
      issuing an access sub-node auto-configuration request; and
   in the backhaul sub-node:
      the proxy system intercepting the access sub-node auto-configuration request; and
      responding to the access sub-node in dependence on the at least one configuration parameter for the access sub-node stored.

19. An apparatus comprising:
   means for providing a backhaul connection to a communications network and comprising proxy means; and
   means for providing an access cell to which user equipment can connect,
   wherein the apparatus is responsive to a configuration trigger to perform a configuration process comprising:
   the means for providing a backhaul connection performing a backhaul sub-node auto-configuration process comprising connecting to a further network node, determining configuration parameters for the means for providing the backhaul connection, and storing in the proxy means at least one configuration parameter for the means for providing the access cell in dependence on the configuration parameters determined;
   the means for providing an access cell issuing an access sub-node auto-configuration request; and
   the proxy means intercepting the access sub-node auto-configuration request and responding to the means for providing an access cell in dependence on the at least one configuration parameter for the means for providing an access cell stored.

* * * * *